US006724993B2

United States Patent
Koike et al.

(10) Patent No.: US 6,724,993 B2
(45) Date of Patent: Apr. 20, 2004

(54) OPTICAL TRANSMITTER-RECEIVER

(75) Inventors: Yasuhiro Koike, Yokohama (JP); Takeshi Ota, Tokyo (JP)

(73) Assignee: Telecommunications Advancement Organization of Japan, Tokyo (JP)

( * ) Notice: Subject to any disclaimer, the term of this patent is extended or adjusted under 35 U.S.C. 154(b) by 448 days.

(21) Appl. No.: 09/771,794

(22) Filed: Jan. 29, 2001

(65) Prior Publication Data

US 2001/0033406 A1 Oct. 25, 2001

(30) Foreign Application Priority Data

Feb. 3, 2000 (JP) ........................................ 2000-025855

(51) Int. Cl.$^7$ .......................... H04B 10/08; H04B 17/00
(52) U.S. Cl. .............................. 398/9; 398/12; 398/15; 398/16; 398/20; 398/22; 398/37
(58) Field of Search ........................... 398/20, 22, 37, 398/15, 12, 16

(56) References Cited

U.S. PATENT DOCUMENTS

| 4,191,457 A | * | 3/1980 | Zingher ........................ 353/44 |
| 4,994,675 A | * | 2/1991 | Levin et al. ................. 250/551 |
| 5,099,349 A | * | 3/1992 | Yoshida et al. ............... 398/20 |
| 5,130,837 A | * | 7/1992 | Kitamura et al. ............. 398/37 |
| 5,428,471 A | | 6/1995 | McDermott |
| 5,483,370 A | * | 1/1996 | Takahashi .................... 398/50 |
| 5,615,033 A | * | 3/1997 | Yoshida et al. ............... 398/15 |
| 5,923,453 A | * | 7/1999 | Yoneyama .................... 398/34 |
| 6,359,708 B1 | * | 3/2002 | Goel et al. .................... 398/15 |
| 6,366,377 B1 | * | 4/2002 | Tajima ......................... 398/82 |
| 6,496,304 B2 | * | 12/2002 | Shiozaki et al. .......... 359/341.43 |
| 6,504,630 B1 | * | 1/2003 | Czarnocha et al. ............ 398/15 |
| 6,522,803 B1 | * | 2/2003 | Nakajima et al. ............. 385/24 |

FOREIGN PATENT DOCUMENTS

| JP | 03-212266 | 9/1991 |
| JP | 05-122153 | 5/1993 |
| JP | 11-55194 | 2/1999 |

* cited by examiner

Primary Examiner—Jason Chan
Assistant Examiner—Alex H Chan
(74) Attorney, Agent, or Firm—Notaro & Michalos P.C.

(57) ABSTRACT

An optical transmitter-receiver that does not have a harmful effect on the human eye when an optical fiber is disconnected from the apparatus and is able to determine easily when the fiber has been reconnected. A normal signal detector and a dummy signal detector determine when a signal from another optical transmitter-receiver is no longer received due to disconnection of an optical fiber. This result switches an output switch and causes a second reference voltage to be transmitted to an optical output automatic controller, thereby reducing the power of a laser diode. At the same time, a signal switch provides a dummy signal having a low frequency to the laser diode in place of the normal signal, resulting in output of a dummy optical signal. At this time, the other optical transmitter-receiver also outputs a dummy optical signal. When the optical fiber is reconnected, the dummy signal transmitted from the other optical transmitter-receiver is detected. Upon detection, the output of the laser diode is set to a normal high value, and a normal signal is output.

3 Claims, 15 Drawing Sheets

PRIOR ART

PRIOR ART

PRIOR ART

OPTICAL TRANSMITTER-RECEIVER

TECHNICAL FIELD

The present invention relates to an optical transmitter-receiver in an optical communications system using optical fibers, and particularly to an optical transmitter-receiver suitable for a system employing plastic optical fibers. In addition, the present invention relates to a mechanism for preventing the adverse effects of laser light from the optical transmitter-receiver on humans.

BACKGROUND ART

FIG. 13 is an explanatory diagram showing a conventional fiber-optic communications system. As shown in FIG. 13(a) the system includes optical transmitter-receivers 101 and 102 linked by optical fibers 103 and 104. An optical signal 105 is transmitted from the optical transmitter-receiver 101 to the optical transmitter-receiver 102 via the optical fiber 103. Similarly, an optical signal 106 transmitted from the optical transmitter-receiver 102 is transferred to the optical transmitter-receiver 101 via the optical fiber 104. This fiber-optic communications system is referred to as a point-to-point type.

FIG. 13(b) shows a shared bus type communications system. This system comprises optical transmitter-receivers 111, 112, 113, and 114 and a passive optical splitter 115. Optical signals transmitted from the optical transmitter-receiver 111 are transferred to the optical transmitter-receivers 112 through 114 after being branched by the optical splitter 115. Optical signals transmitted from the optical transmitter-receivers 112 through 114 are merged by the optical splitter 115 and transferred to the optical transmitter-receiver 111. In actual operations, the system uses a time-sharing method to prevent the optical transmitter-receivers 112 through 114 from transmitting optical signals simultaneously. The optical splitter 115 can be thought of as a device functioning to combine the optical signal channels.

FIG. 14 is a timing chart illustrating how optical signals are transferred in a conventional fiber-optic communications system. FIG. 14(a) shows the state of optical signal transmission in a fiber-optic communications system using the point-to-point method, as shown in FIG. 13(a). As shown in the diagram, valid data 122 and 124 are transmitted when available, and idle signals 121 and 123 are transmitted when there is no valid data. During normal operations, therefore, some type of optical signal is being exchanged between the two optical transmitter-receivers 101 and 102 at all times.

FIG. 14(b) is a time chart for the state of optical signals in the shared bus optical communications system of FIG. 13(b). In this method, valid data 125 and 126 are transmitted, but idle signals are not transferred therebetween. Therefore, there are periods in which no optical signals are being transferred.

The above-described optical transmitter-receivers do not give rise to problems when properly connected by cables. However, if an optical transmitter-receiver 131 is not connected to an optical fiber, as shown in FIG. 15(a), a laser light 132 is emitted from the optical transmitter-receiver 131 into free space. Such laser light 132 can have an adverse effect on a human eye 133. The laser light can adversely affect the human eye even when a cover or the like is provided over the optical fiber connection point on the optical transmitter-receiver. For example, when an optical fiber 135 is connected on one end to the optical transmitter-receiver 131 and while the other end is open to free space, as shown in FIG. 15(b), a laser light 136 is emitted into free space from the open end of the optical fiber 135 and can cause harm to the human eye 133. Conventionally, the output of the laser light from the optical transmitter-receiver has been limited to avoid harming the human eye. In other words, the optical transmitter-receiver is designed to prevent effects on the human eye even when the laser light is emitted into free space.

With the increasing transfer rates of laser light, however, a high output laser light is becoming more necessary to enable proper reception of the laser signals that decay from long-distance transfers through optical fibers. Recently, a graded index plastic optical fiber (GI-POF) was developed. This optical fiber is far less expensive than conventional quartz optical fibers and has a broad transmission band, which is thought to be suitable for application to local area networks (LAN) and communication networks of information appliances. At this stage, however, the GI-POF still has a greater loss than quartz optical fibers and cannot be transmitted reliably over long distances.

As a safety measure, a mechanism has been proposed in U.S. Pat. No. 5,428,471 that automatically shuts down operations of an optical amplifier locally when there is a disruption in the optical fiber and automatically restores operations when the connection has been restored.

DISCLOSURE OF THE INVENTION

In view of the foregoing, it is an object of the present invention to provide a mechanism that improves the transmission output of an optical transmitter-receiver suitable for a point-to-point fiber-optic communications system, while preventing adverse effects on the human eye.

These objects and others will be attained by an optical transmitter-receiver for use in a point-to-point fiber-optic communications system connected by optical fibers. The optical transmitter-receiver comprises a dummy signal generator; a detector for detecting an optical signal received from another optical transmitter-receiver; a switch for switching between a dummy signal and a normal signal and transmitting a dummy signal when an optical signal is detected from another optical transmitter-receiver; and a mechanism for changing the transmission power and reducing the transmission power when an optical signal is detected from another optical transmitter-receiver.

An optical transmitter-receiver for point-to-point optical transmission and having the construction described above can prevent harm to the human eye by laser light emitted into free space when an optical fiber connection is broken. Further, the transmitter-receiver can automatically resume proper transmission when the optical fiber is properly reconnected.

The dummy signal generator can be provided either separately from a mechanism for outputting normal signals or together with the same. The above features and others will be described in more detail below within the scope of the attached claims.

BEST MODE FOR CARRYING OUT THE INVENTION

Preferred embodiments of the present invention will be described below.

[FIRST EMBODIMENT]

Figure 1:
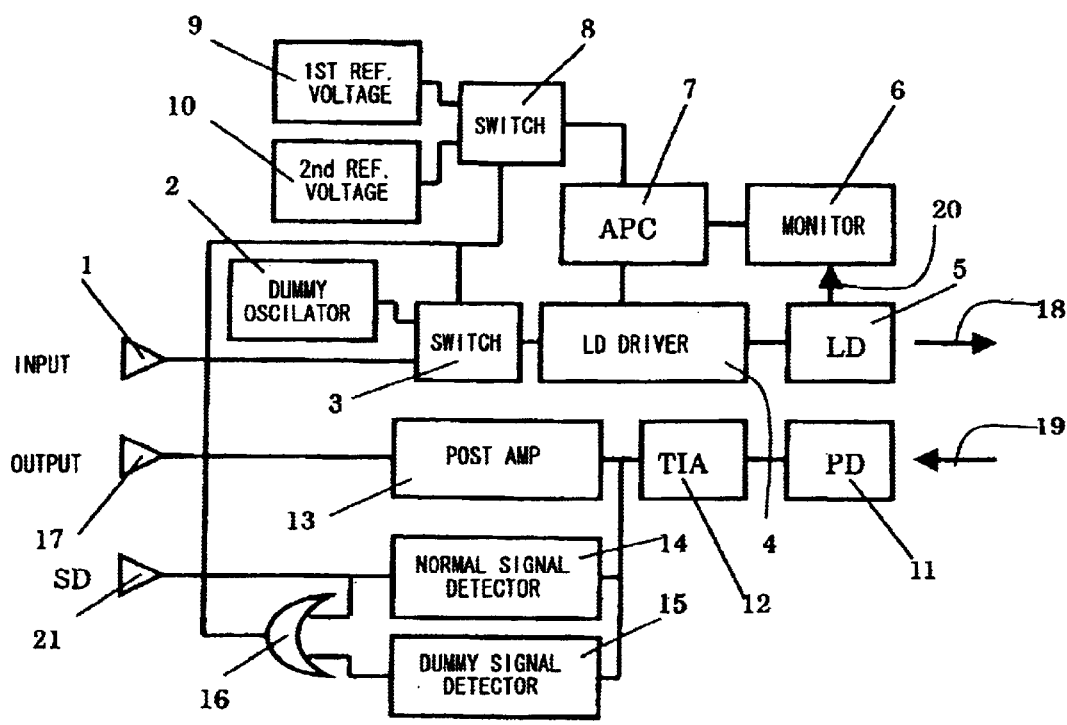
FIG. 1 is a block diagram showing an optical transmitter-receiver according to a first embodiment of the present invention.

FIG. 1 is a block diagram showing an optical transmitter-receiver according to a first embodiment of the present invention. An electric signal is applied to an input terminal 1. The electric signal passes through a signal switch 3 and a laser driver 4 to drive a laser diode 5. A laser light 18 (optical signal) emitted from the laser diode 5 is modulated by the electric signal applied to the input terminal 1. A dummy signal oscillator 2 is connected to the signal switch 3. When an optical signal is not detected from a corresponding optical transmitter-receiver, as described later, the signal from the dummy signal oscillator 2 is transmitted as the laser light 18 in place of the signal from the input terminal 1. The frequency generated by the dummy signal oscillator 2 is selected to be sufficiently lower than the frequency of the optical signal. If a normal optical signal is 1 gigabit/sec, for example, the value selected for the dummy signal is 1 MHz.

An optical signal 19 transferred via optical fibers from the opposing optical transmitter-receiver is converted into a current signal by a photodiode 11. The current signal is converted to a voltage signal by a transimpedance amp 12. The voltage signal is converted to a digital electric signal by a post amp 13 having a waveform shaping function and output via an output terminal 17.

A signal portion 20 of the optical signal emitted from the laser diode 5 is transmitted to a monitor light detector 6 (photodiode), where it is converted to a current signal and transmitted to an optical output automatic controller 7. The optical output automatic controller 7 maintains the optical signal output at a fixed value. The signal output from the optical output automatic controller 7 is combined with either a first reference voltage 9 or a second reference voltage 10 selected by an output switch 8. The first reference voltage 9 regulates the optical signal output during normal operations. This reference voltage is selected to control the laser light output at +6 dBm (4 mW). The second reference voltage 10 maintains the laser light output at −6 dBm (0.25 mW), for example, which is a level that does not harm the human eye. This reference voltage is selected when the optical fiber connection is broken and a signal from the opposing optical transmitter-receiver is not receiving properly.

Figure 2:
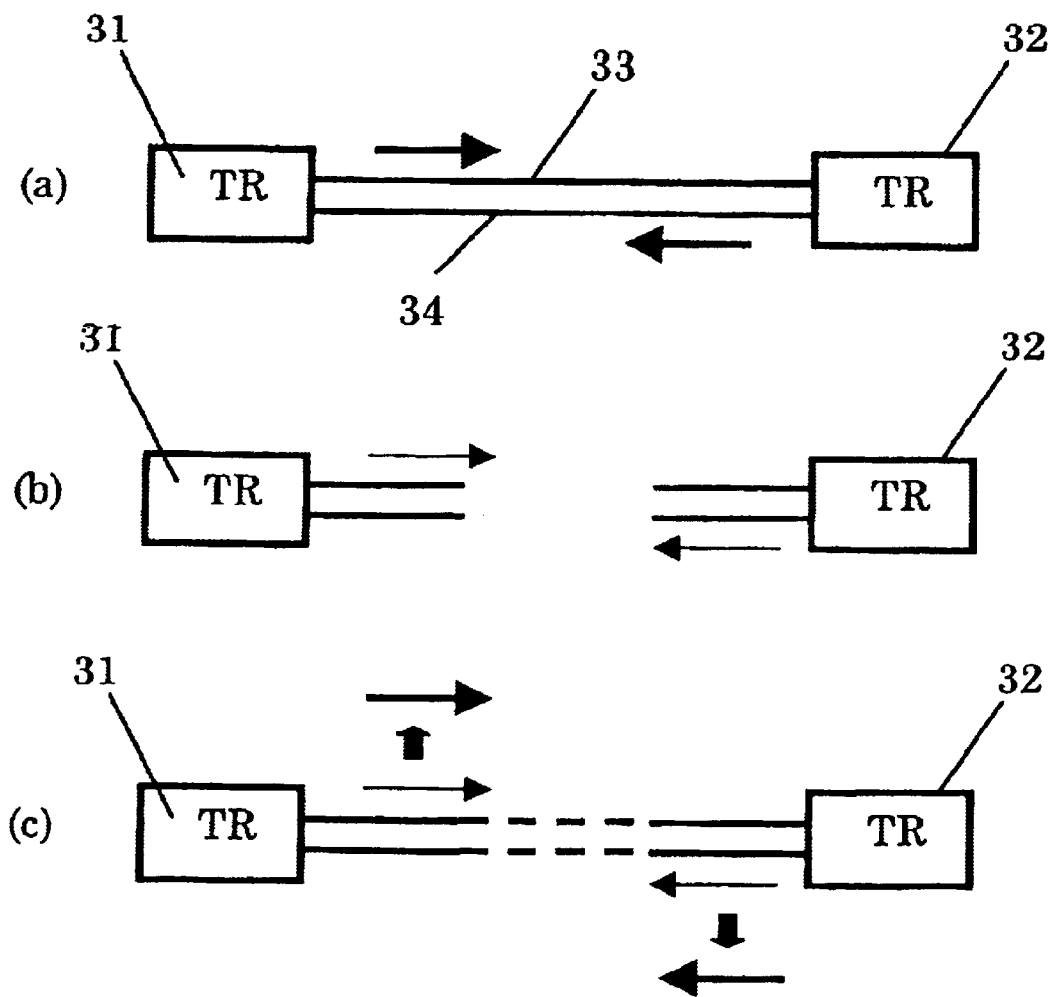
FIG. 2 is a time chart showing a typical operation of the optical transmitter-receiver.

FIG. 2 is an explanatory diagram showing two optical transmitter-receivers 31 and 32 having the construction shown in FIG. 1. FIG. 2(a) shows the state of the optical transmitter-receivers 31 and 32 connected properly to each other by the optical fibers 33 and 34. FIG. 2(b) shows the same optical transmitter-receivers 31 and 32 when the connection has been broken. FIG. 2(c) shows the exact moment when the optical transmitter-receivers 31 and 32 have been properly reconnected.

When the optical transmitter-receivers 31 and 32 are properly connected, optical signals (1 gigabit/sec) are transmitted in a high output mode (+6 dBm). However, if the optical fiber connection is broken, preventing one transmitter-receiver from receiving signals from the other, the transmission is switched to a low output mode (−6 dBm), which is safe for the human eyes. Furthermore, a low speed dummy signal (1 MHz) is transmitted in place of the normal optical signal. The low output signal is transmitted rather than stopping transmission of the optical signals in order that the optical transmitter-receivers 31 and 32 can detect when the connection has been reestablished. If the optical signals are blocked entirely, it is not possible do detect the reconnection.

Figure 3:
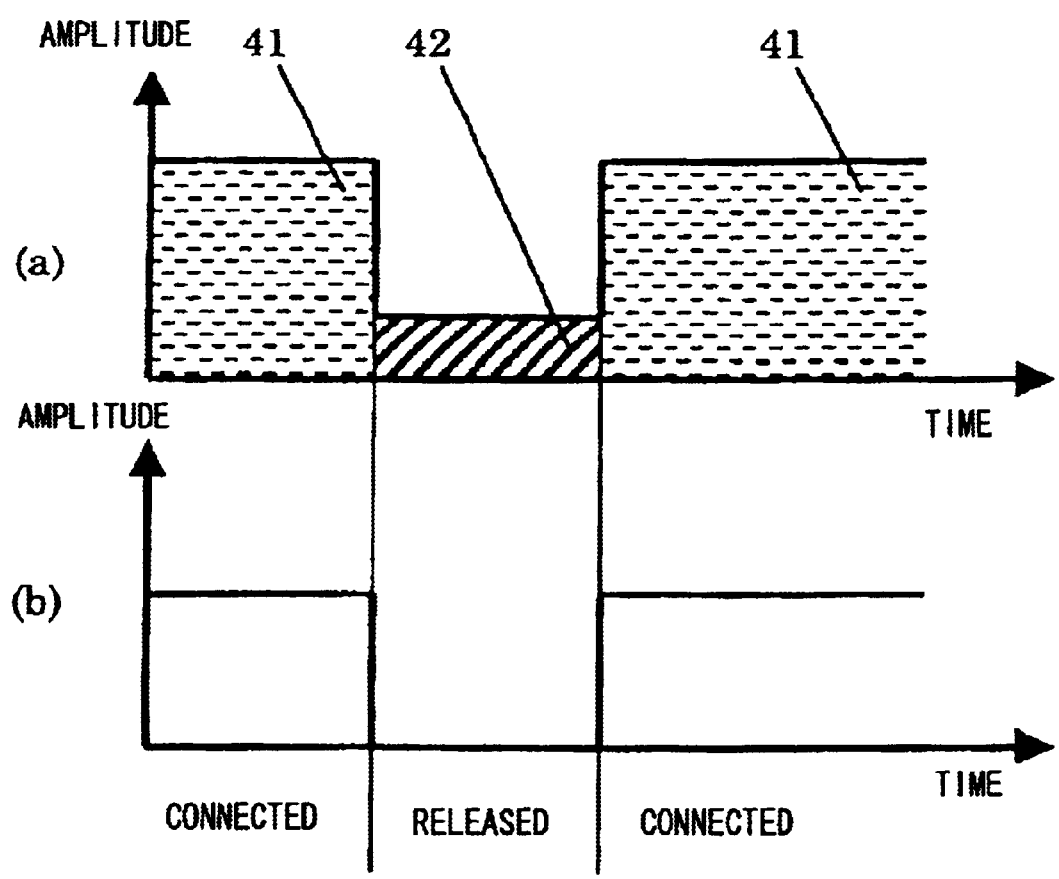
FIG. 3 is a time chart showing transmission and reception states of the optical transmitter-receiver.

FIG. 3 is a time chart showing a typical operation of the optical transmitter-receivers 31 and 32. While a proper connection has been acquired, the optical transmitter-receivers 31 and 32 transmit a normal signal 41. However, when the connection is broken, the optical transmitter-receivers 31 and 32 output a dummy signal 42 having a low output and a low frequency.

Next, a mechanism for performing the above operation will be described with reference again to FIG. 1. As shown in FIG. 1, output from the transimpedance amp 12 is transmitted to a normal signal detector 14 and a dummy signal detector 15 in addition to being sent to the post amp 13. The normal signal detector 14 detects a normal optical signal, while the dummy signal detector 15 can detect a dummy signal from the other optical transmitter-receiver.

Figure 4:
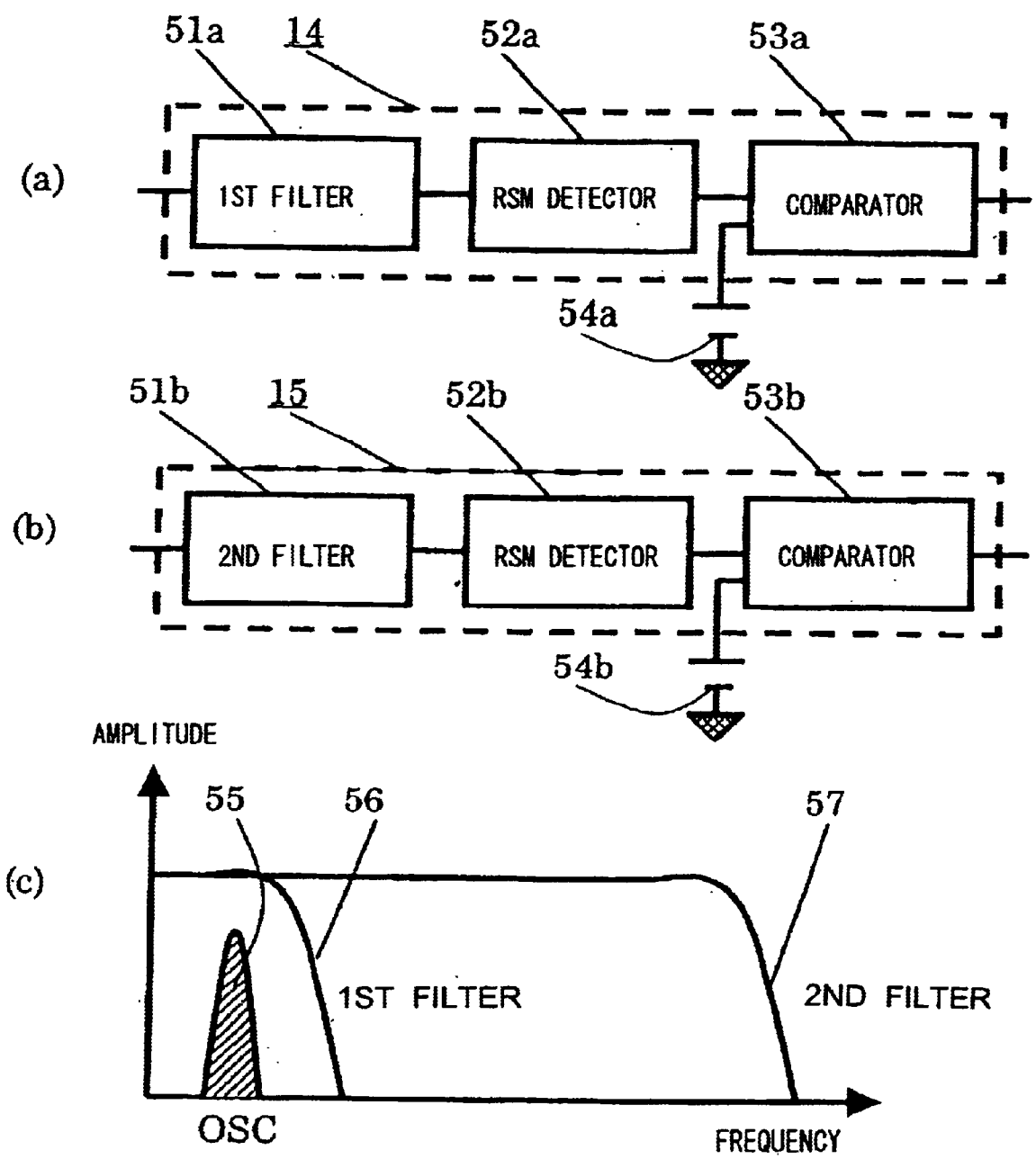
FIG. 4 includes block diagrams (a and b) showing the construction of the normal signal detector and the dummy signal detector and a graph (c) showing the characteristics of the filters.

FIG. 4(a) shows the construction of the normal signal detector 14. The normal signal detector 14 comprises a first low pass filter 51a, a root mean square detector 52a, a reference voltage 54a, and a voltage comparator 53a. An input signal passes through the first low pass filter 51a and is converted to a DC voltage corresponding to the root mean square value of the optical signal by the root mean square detector 52a. The voltage comparator 53a compares this DC voltage to the reference voltage 54a and inputs a high level digital signal when the root mean square value exceeds the reference voltage.

FIG. 4(b) shows the construction of the dummy signal detector 15. The dummy signal detector 15 comprises a second low pass filter 51b, a root mean square detector 52b, a reference voltage 54b, and a voltage comparator 53b. The input signal passes through the second low pass filter 51b and is converted to a DC voltage corresponding to the root mean square of the optical signal by the root mean square detector 52b. The voltage comparator 53b compares this DC voltage to the reference voltage 54b and outputs a high level digital signal when the root mean square value exceeds the reference value.

FIG. 4(c) is a graph showing the relationship between the cutoff frequencies of the first low pass filter 51a and second low pass filter 51b and the frequency generated by the dummy signal oscillator 2. The cutoff frequency of the first low pass filter 51a is selected to include the band of the optical signal being used, such as 1 GHz. For example, the dummy frequency could be set at 1 MHz and the cutoff frequency of the second low pass filter 51b at 2 MHz. FIG. 4(c) shows the relative relationships between cutoff characteristics 56 of the first low pass filter 51a, cutoff characteristics 57 of the second low pass filter 51b, and a dummy signal spectrum 55.

Output from the normal signal detector 14 is output to both a signal detecting terminal 21 and a logical OR circuit 16. The logical OR circuit 16 takes the logical OR of output from the normal signal detector 14 and the dummy signal detector 15. The output from the logical OR circuit 16 is used to control the signal switch 3 and the output switch 8. Since the normal signal detector 14 functions to detect a normal signal, it is possible to determine that the optical fiber is properly connected when the output from the normal signal detector 14 is high. Further, since the dummy signal detector 15 can detect a dummy signal, it is possible to determine when an optical fiber connection has been restored when the output from the dummy signal detector 15 is high. When both outputs from the normal signal detector 14 and dummy signal detector 15 are low level, it can be determined that the optical fiber connection is still broken.

The logical OR circuit 16 outputs the logical OR of outputs from the normal signal detector 14 and dummy signal detector 15. When the output of the logical OR circuit 16 is low level, the output switch 8 selects the second reference voltage 10 and the optical output automatic controller 7 sets the output of the laser diode to the low output mode (−6 dBm). Also, when the output from the logical OR circuit 16 is low level, the signal switch 3 selects the dummy signal oscillator 2 to be transmitted to the laser driver 4. Accordingly, a dummy signal having a low output (−6 dBm) and a low frequency (1 MHz) is effectively emitted from the optical transmitter-receiver.

When the optical fiber connection is restored, the dummy signal is detected and the output of the dummy signal detector 15 is changed to high level. Accordingly, output from the logical OR circuit 16 changes to high level. As a result, the signal switch 3 selects the normal signal and the output switch 8 selects the first reference voltage 9, enabling the normal signal to be transmitted in the high output mode. The other transmitter-receiver switches in the same way and is able to receive the normal signals by the photodiode 11. The output of the normal signal detector 14 is changed to high level, indicating to the signal detecting terminal 21 that a normal signal is being received.

Figure 5:
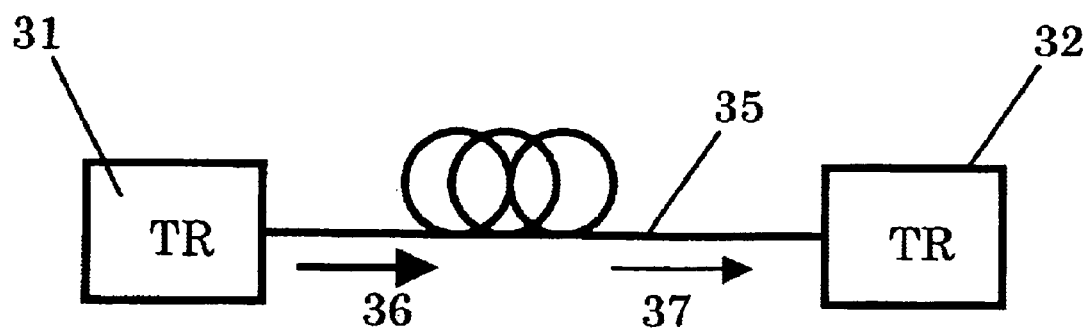
FIG. 5 is an explanatory diagram showing the state of optical transmission when the signal is decayed by the optical fiber.

The dummy signal is set to a lower frequency than the normal signal for the following reason. As shown in FIG. 5, an optical signal 36 is propagated along an optical fiber 35 connecting the optical transmitter-receivers 31 and 32. While traveling along the fiber, the optical signal 36 decays and becomes an optical signal 37. The optical signal 37 can drop to an adjustable signal level that can be received in the high output mode. If the optical fiber connection is broken at this time, transmission between the optical transmitter-receivers 31 and 32 is switched to the low output mode. While the signal level was at a minimum level that could be received in the high output mode, by switching to the low output mode, the signal level drops further, making the signal impossible to detect when the connection has been restored. With a low frequency dummy signal of 1 MHz, compared to the normal signal of 1 Gbit/sec, it is possible to minimize the input conversion noise by limiting the band of the signal detector. Hence, it is possible to design a signal detector that can receive a dummy signal, even though a normal signal cannot be received in this low output mode.

Figure 6:
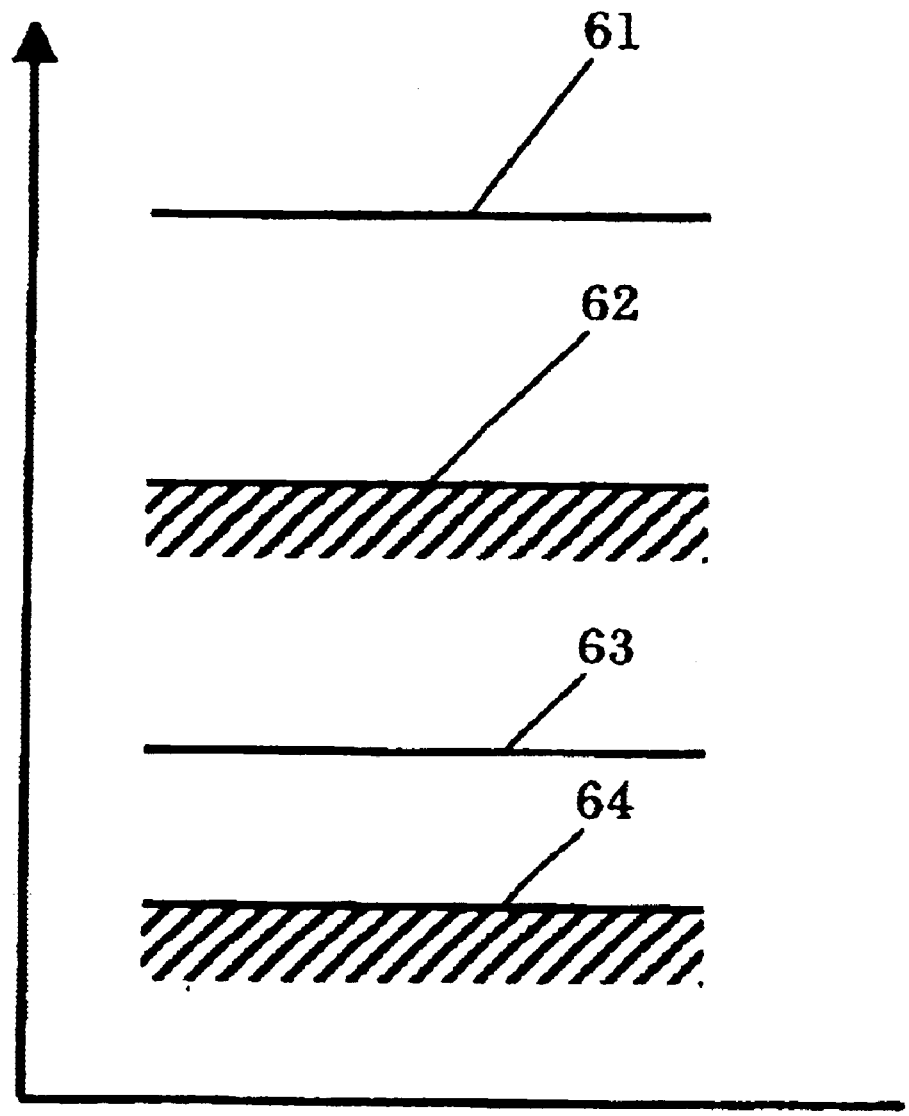
FIG. 6 is a graph showing the signal levels of the normal signal, dummy signal, and noise.

FIG. 6 is an explanatory diagram showing the signal levels. The line 61 represents the minimum reception level of a normal signal. The line 62 indicates the input conversion noise level when the frequency band is 1 GHz (the band of the normal signal). The line 63 is the minimum reception level of a dummy signal. The line 64 indicates the input conversion noise level when the band is 2 MHz.

[SECOND EMBODIMENT]

Figure 7:
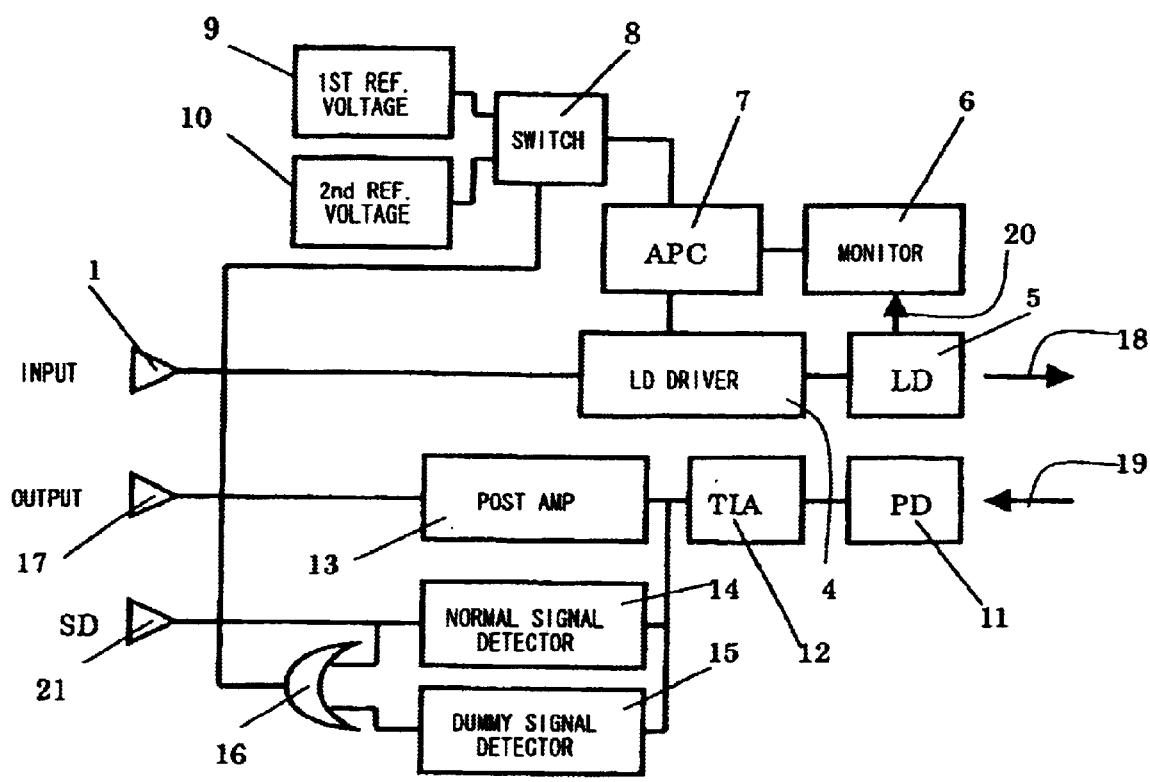
FIG. 7 is a block diagram showing an optical transmitter-receiver according to a second embodiment of the present invention.

FIG. 7 is a block diagram showing the optical transmitter-receiver according to a second embodiment of the present invention. This embodiment omits the dummy signal oscillator 2 and signal switch 3 of the first embodiment. By selecting an appropriate encoding format for the optical signal, the same functions as described in the first embodiment can be achieved without generating a dummy signal.

Figure 8:
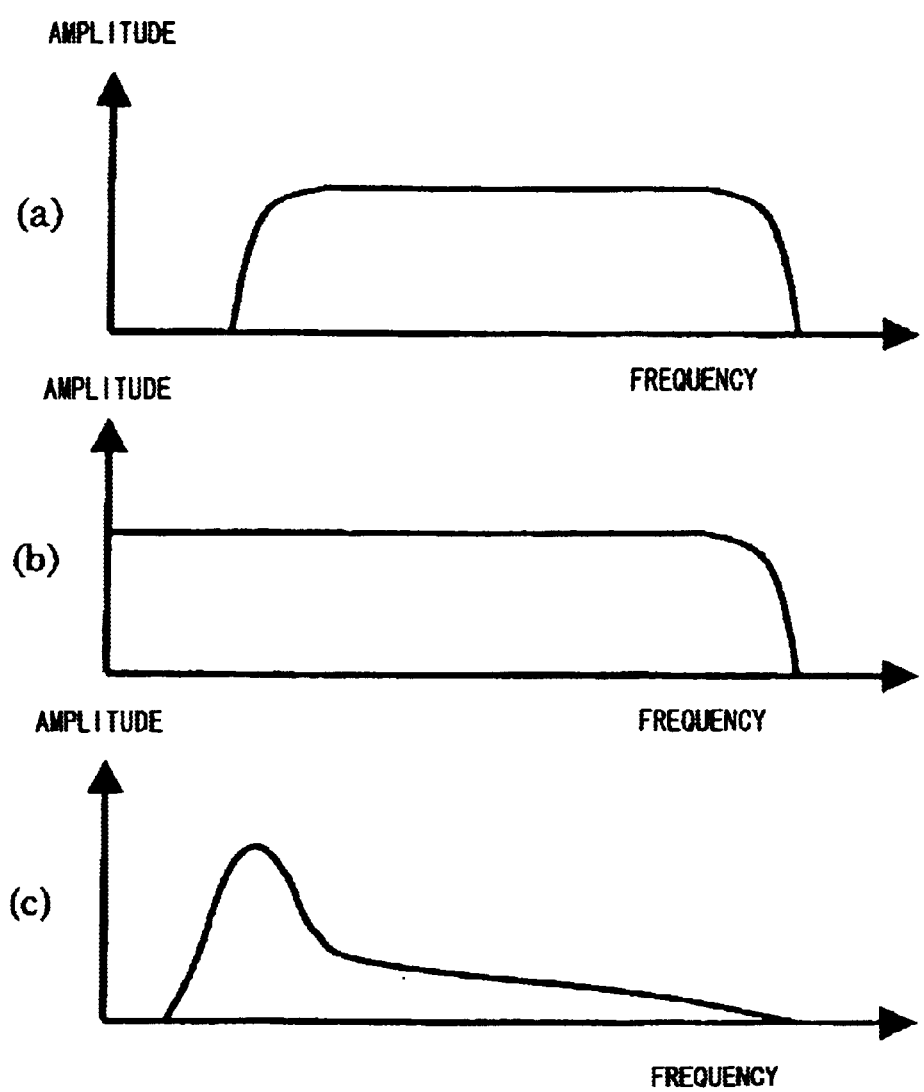
FIG. 8 includes graphs of power spectrums for various encoding methods.

FIG. 8 shows graphs of power spectrums for various encoding methods. FIG. 8(a), for example, shows a power spectrum of a block encoding scheme, such as the 8B/10B method. Since this method maps 8 bits of data to a 10-bit code, a 10-bit word is always designed to generate a certain low level and high level reversal. The spectrum graphed in FIG. 8(a) does not exist at the low-frequency end. Accordingly, it is not possible to deduct signals around 1 Mhz, for example, when employing an 8B/10B encoding at 1 Gbits/sec. Therefore, this method is not suitable for the optical transmitter-receiver of the second embodiment shown in FIG. 7. However, a nearly uniform power spectrum, such as that shown in FIG. 8(b), can be formed using a different encoding method, such as a scramble encoding. This type of encoding method can be applied to the optical transmitter-receiver of the second embodiment, shown in FIG. 8.

Another encoding method has a power spectrum with a special frequency peak, as shown in FIG. 8(c). By providing a dummy signal detector 15 having a band pass filter matching the peak frequency of this spectrum, it is possible to achieve a function essentially equivalent to that of the first embodiment without providing a dummy signal generating mechanism. This embodiment is advantageous in that the construction of the optical transmitter-receiver is simple, thereby reducing manufacturing costs.

[THIRD EMBODIMENT]

Figure 9:
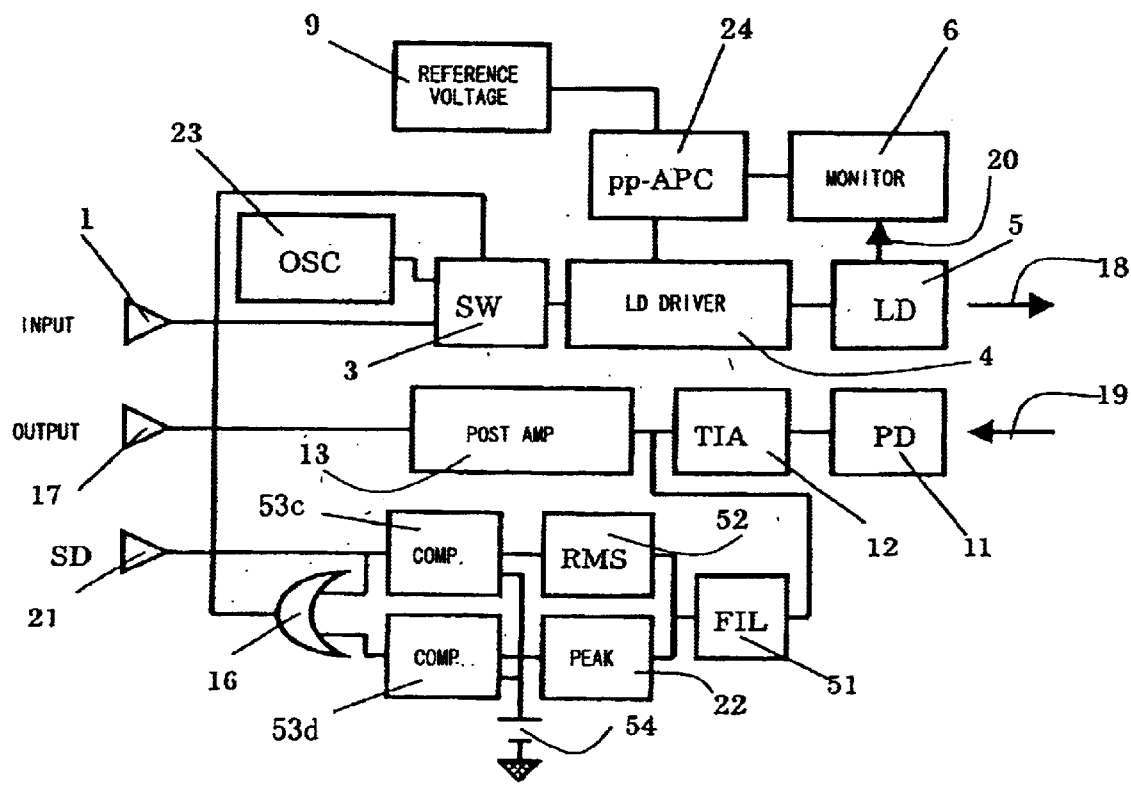
FIG. 9 is a block diagram showing an optical transmitter-receiver according to a third embodiment of the present invention.

FIG. 9 is a block diagram showing an optical transmitter-receiver according to the third embodiment of the present invention. The optical transmitter-receiver of the third embodiment differs from that of the previous embodiments in the following ways. A dummy signal oscillator 23 is provided in place of the dummy signal oscillator 2 for generating a separate dummy signal. The normal signal detector 14 and dummy signal detector 15 of the previous embodiments is replaced by a low pass filter 51, a root mean square detector 52, a peak value detector 22, two comparators 53c and 53d, and one reference voltage 54. Further, the optical output automatic controller 7 is replaced by a peak value control type optical output automatic controller 24. In addition, the laser light output is controlled for a single first reference voltage 9, eliminating the need for a reference voltage switching mechanism.

Figure 10:
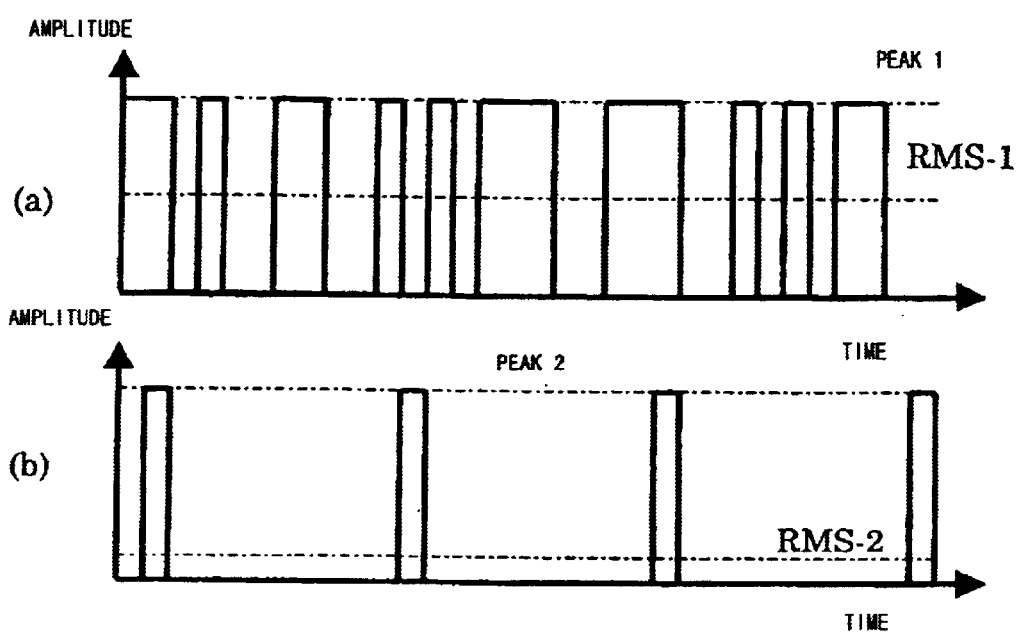
FIG. 10 includes graphs showing the relationship between the waveforms of the normal and dummy signals in the third embodiment.

In the present embodiment, the dummy signal is different from that in the first embodiment. Instead of generating a low output dummy signal at a low frequency, a high output pulse having a low duty factor is used as the dummy signal (see FIG. 10). FIG. 10(a) shows the waveform of a normal signal. The peak value of the normal signal shown in FIG. 10(a) (indicated by peak 1 in FIG. 10) and the peak value of the dummy signal (indicated by peak 2 in FIG. 10) are set to approximately the same level. However, since the duty factor of the dummy signal is low, the root mean square value of the dummy signal (indicated by RMS 2 in FIG. 10) is lower than the root mean square value of the normal signal (indicated by RMS 1 in FIG. 10). The limit of laser light exposure on the human eye is regulated by the integral of a time on the order of several hundred milliseconds, which is a considerably long time. Hence, it is possible to prevent harm to the human eye by using the dummy signal shown in FIG. 10(b).

In FIG. 9, output from the transimpedance amp 12 passes through the low pass filter 51 and is applied in parallel to the root mean square detector 52 and peak value detector 22. Output from the root mean square detector 52 and peak value detector 22 are applied to the comparators 53c and 53d respectively. Using the same reference voltage 54, the comparators 53c and 53d compare outputs from the root mean square detector 52 and peak value detector 22 respectively.

With an optical transmitter-receiver having the above construction, the output from the comparator 53c remains at a low level when a dummy signal is received, while the output of the comparator 53d is changed to high level. When a normal signal is received, outputs from both the comparators 53c and 53d are set to high level. When neither a dummy signal nor a normal signal is received, both outputs from the comparators 53c and 53d are set to low level. Accordingly, the same operations described in the first embodiment can be achieved in the third embodiment by using the signal switch 3 to switch between the signal output from the dummy signal oscillator 23 and the signal output from the input terminal 1 based on output from the logical OR circuit 16.

In the present embodiment, the laser light output when transmitting a dummy signal is limited by the waveform pattern of the dummy signal itself. Therefore, it is not necessary to incorporate a reference voltage switching mechanism in the optical output automatic controller 24 for controlling the peak value. However, it is necessary to control the laser light output based on peak values of the laser light.

Figure 11:
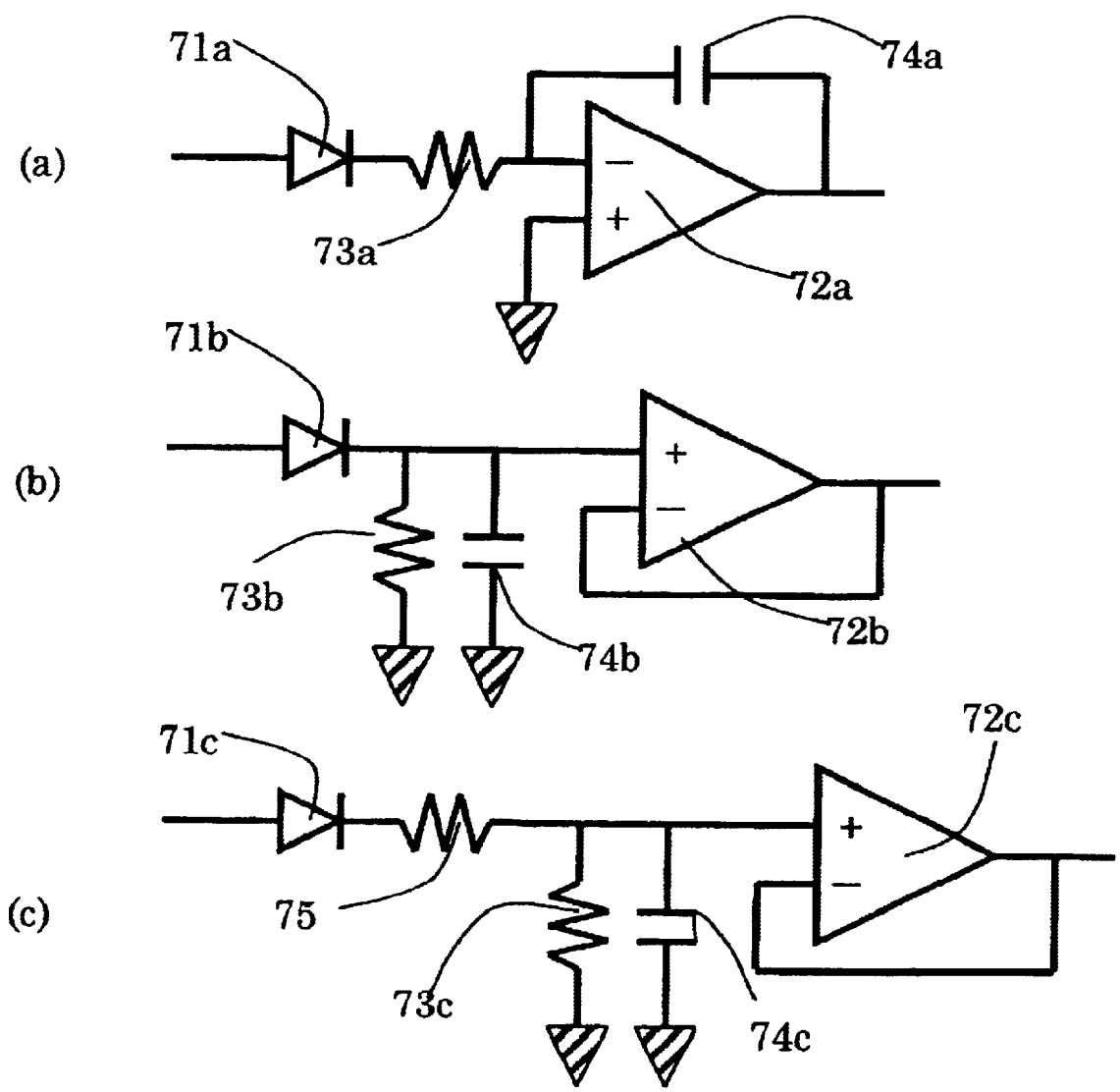
FIG. 11 includes circuit diagrams showing the principle construction of the root mean square circuit and the peak value circuit.

FIG. 11 shows the general construction of a root mean square detector and a peak value detector. FIG. 11(a) is an example of a root mean square detector. The circuit includes a diode 71a for generating a signal by half-wave rectification, and a integral circuit formed of a resistor 73a, a condenser 74a, and an operational amplifier 72a for generating the integral of the signal. Although this circuit is strictly an averaging circuit, it is well known that an average value can be converted to a root mean square value by a prescribed constant, providing the signal waveform is not extremely unusual. Further, the optical transmitter-receiver of the present invention can operate without hindrance using an average value rather than the root mean square value.

FIG. 11(b) is an example of a peak value detector. The detector includes a diode 71b for generating a signal through half-wave rectification. The signal is applied in parallel to a resistor 73b and a condenser 74b. An operational amplifier 72b is connected to a voltage follower. The operations of the circuit are well known in the art.

However, using the circuit in FIG. 11(b) as shown will pickup peaks of spike noise rather than the signal. To prevent this, the circuit shown in FIG. 11(c) can be employed. This circuit adds an additional resistor 75 to the circuit of FIG. 11(b). The diodode 71c, amplifier 72c, resistor 73c, and condenser 74c in FIG. 11(c) correspond to the diode 71b, amplifier 72b, and condenser 74b in FIG. 11(b). This construction can lower effects of spike noise through the storage effect.

Circuits shown in FIG. 11 are used for the root mean square detector 52 and peak value detector 22 of FIG. 9. Further, the circuit of FIGS. 11(b) and 11(c) can be used in the optical output automatic controller 24.

Figure 12:
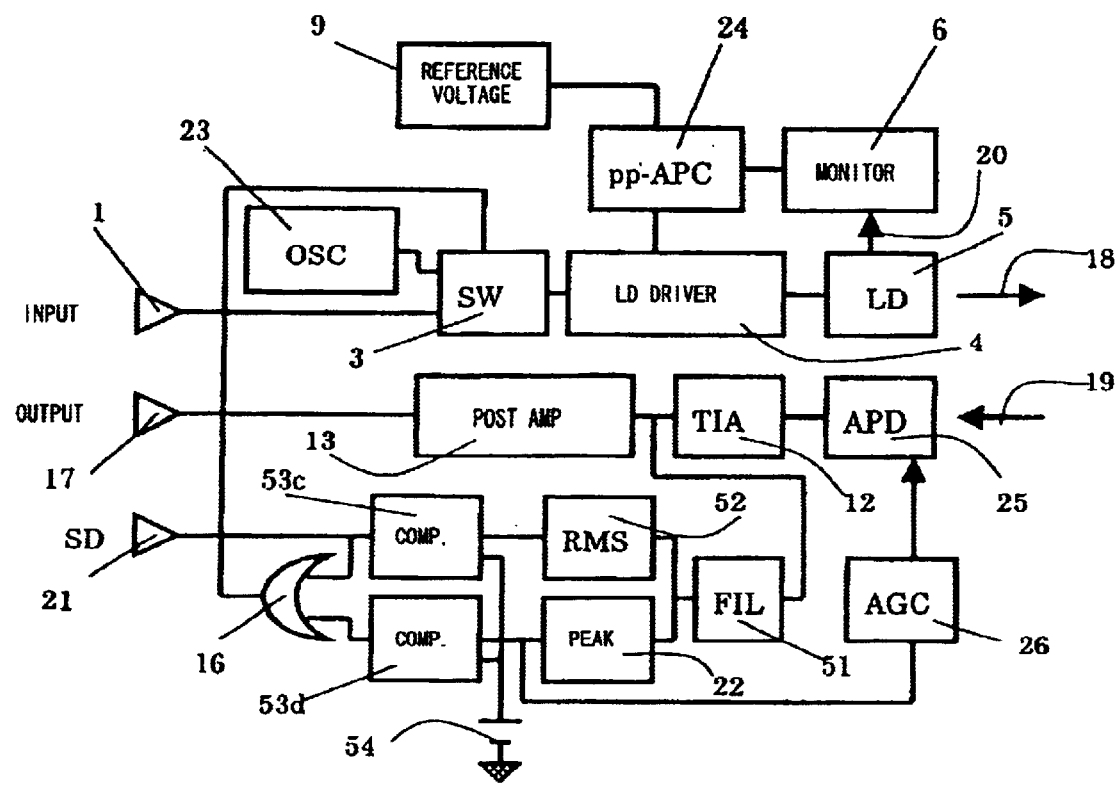
FIG. 12 is a block diagram showing an optical transmitter-receiver according to a fourth embodiment of the present invention.
Figure 13:
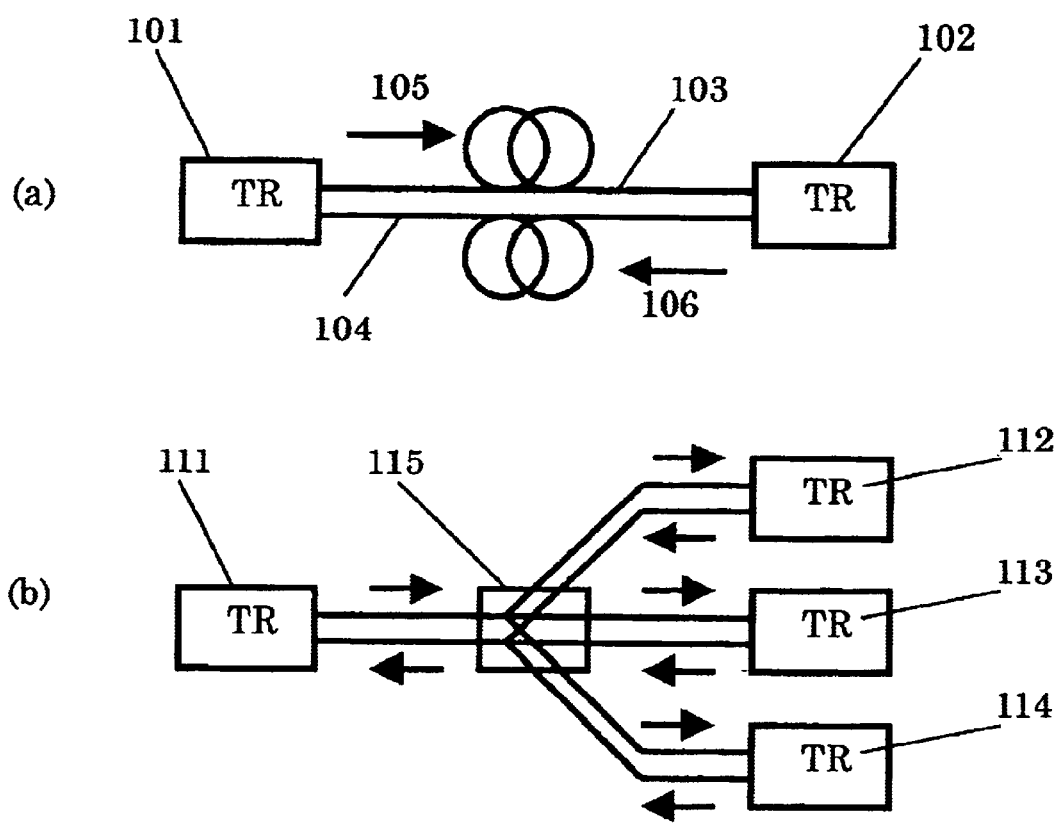
FIG. 13 includes explanatory diagrams showing point-to-point type and shared bus type fiber-optic communications systems.
Figure 14:
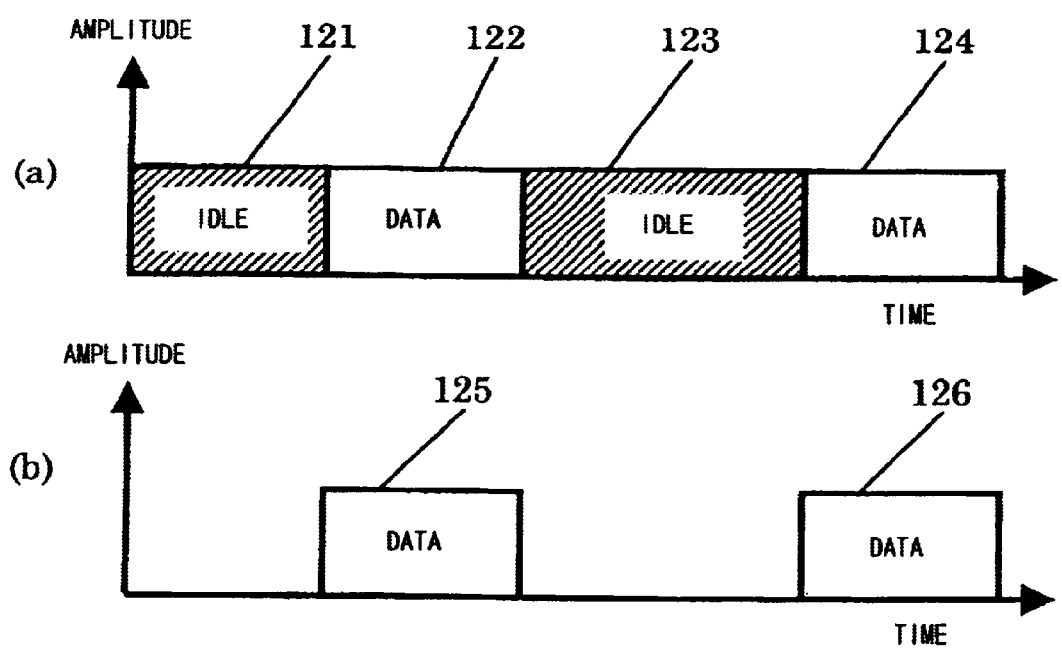
FIG. 14 includes time charts showing signal patterns in the point-to-point type and shared bus type fiber-optic communications systems.
Figure 15:
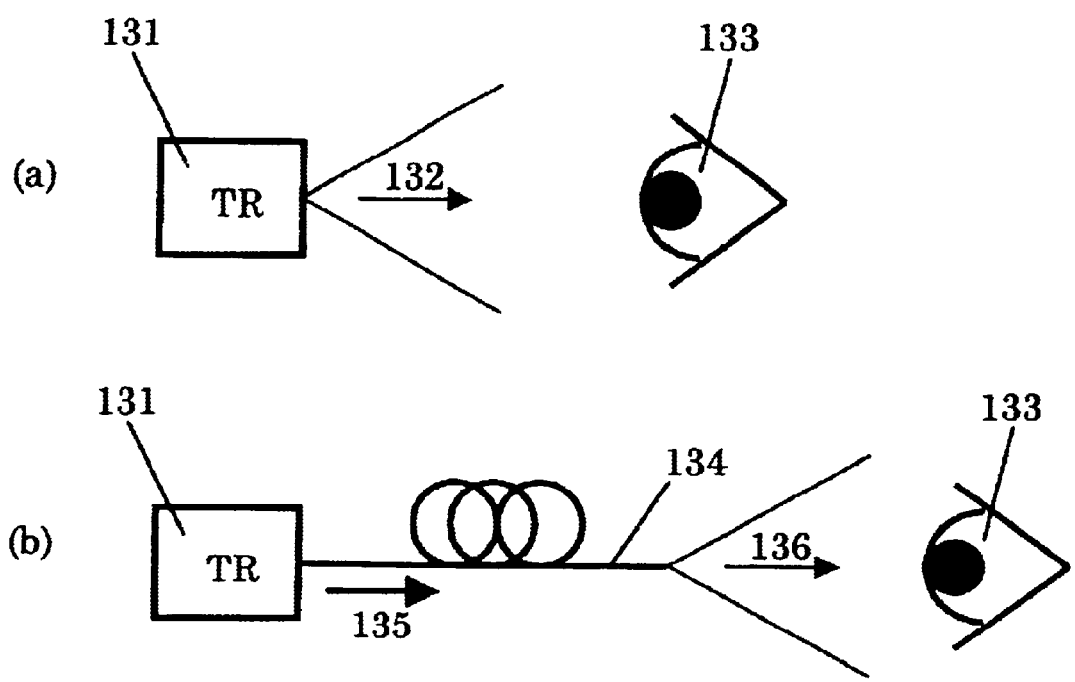
FIG. 15 includes explanatory diagrams showing how light emitted from an open optical transmitter-receiver or an open optical fiber can adversely affect the human eye.

FIG. 12 is a block diagram showing an optical transmitter-receiver according to a fourth embodiment of the present invention. The configuration of the optical transmitter-receiver according to the fourth embodiment differs from the third embodiment in that the photodiode 11 of the third embodiment is replaced by an avalanche photodiode detector 25. The optical transmitter-receiver of the fourth embodiment also includes a mechanism for controlling the multiplication factor of the avalanche photodiode detector 25 based on output from the peak value detector 22 by applying a reverse bias voltage to the avalanche photodiode detector 25.

Since the output from the peak value detector 22 represents the peak value of the dummy signal or normal signal, automatic gain control can be achieved by maintaining this value at a fixed level. Hence, the output from the peak value detector 22 is applied to an automatic gain controller 26. The automatic gain controller 26 is provided with a reference voltage and controls the reverse bias voltage applied to the avalanche photodiode detector 25 based on the difference between the input voltage and the reference voltage.

In the present embodiment, it is possible to perform gain control in the receiver using a laser light output limiter when the connection of the fibers is broken.

According to the present invention, as described above, a point-to-point type optical transmitter-receiver for optical communications can prevent harm to the human eye by laser light being emitted into free space when optical fibers are disconnected. Further, the optical transmitter-receiver of the present invention can automatically restore a proper transmission state when the optical fibers are properly reconnected.

What is claimed is:

1. An optical transmitter-receiver for use in a point-to-point fiber-optic communications system connected by optical fibers, the optical transmitter-receiver comprising:

means for generating a dummy signal; means for detecting an optical signal received from another optical transmitter-receiver;

switching means for switching between a dummy signal and a normal signal, the switching means transmitting a dummy signal when an optical signal is detected from another optical transmitter-receiver;

power changing means for changing the transmission power, the power changing means reducing the transmission power when an optical signal is detected from another optical transmitter-receiver, and an avalanche photodiode for setting the duty factor of the dummy signal lower than that of the normal signal and setting the peaks of both signals to approximately the same level, wherein gain control is performed automatically on output from the avalanche photodiode by inputting feedback of the peak values to the avalanche photodiode.

2. An optical transmitter-receiver as recited in claim 1, wherein the dummy signal has a lower frequency than the normal signal.

3. An optical transmitter-receiver as recited in claim 1, wherein the transmission power is reduced by reducing the pulse duty factor.

* * * * *